S. DODSON.
HULLING AND DRESSING RICE.
No. 38,886. Patented June 16, 1863.
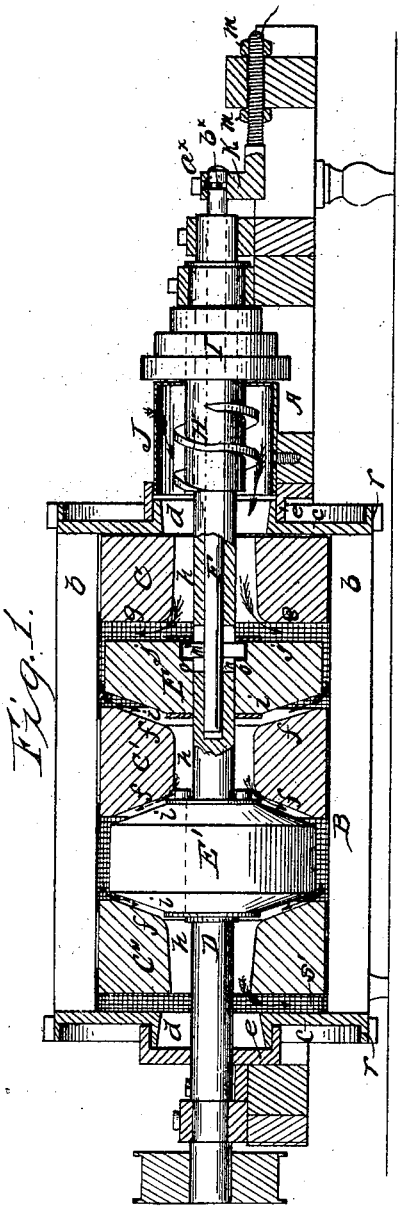
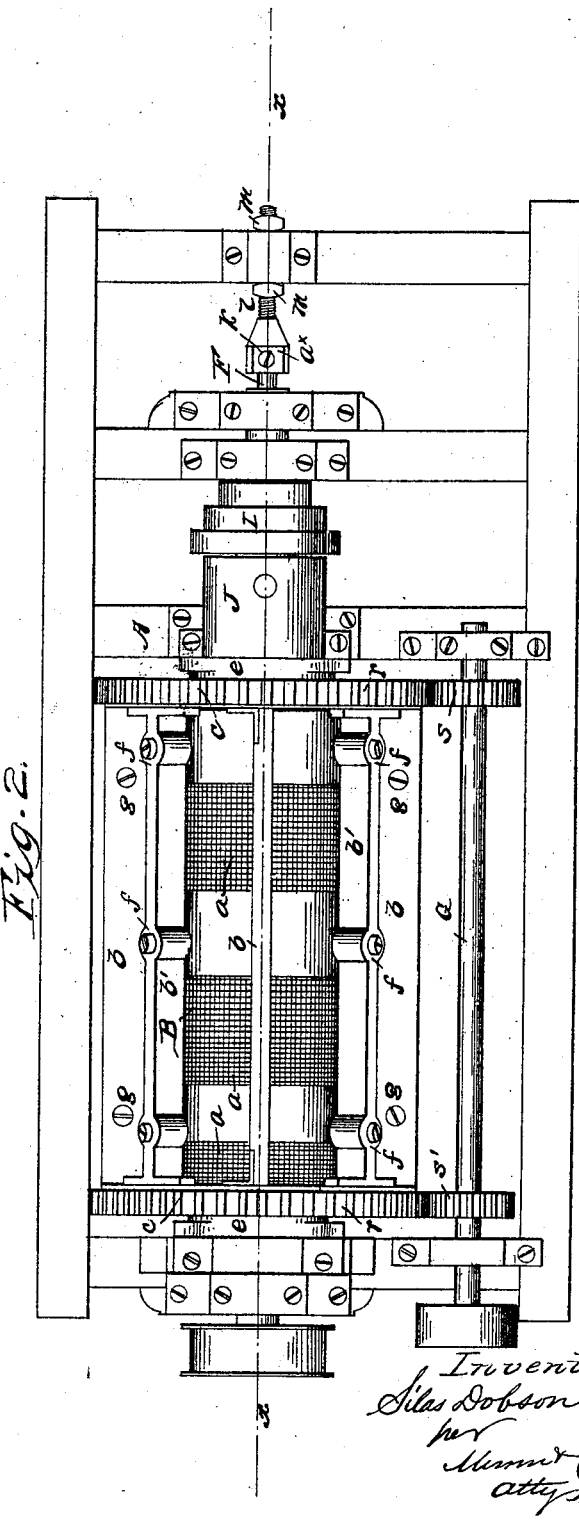
Witnesses:
J. W. Coombs
G. W. Reed
Inventor
Silas Dodson
per
Munn & Co
att'ys

UNITED STATES PATENT OFFICE.

SILAS DODSON, OF BLOOMSBURG, PENNSYLVANIA.

IMPROVEMENT IN HULLING AND DRESSING RICE.

Specification forming part of Letters Patent No. 38,886, dated June 16, 1863.

*To all whom it may concern:*

Be it known that I, SILAS DODSON, of Bloomsburg, in the county of Columbia and State of Pennsylvania, have invented a new and Improved Machine for Hulling and Dressing Rice; and I do hereby declare that the following is a full, clear, and exact description of the same, reference being had to the accompanying drawings, making a part of this specification, in which—

Figure 1 is a longitudinal vertical section of my invention, taken in the line $x\ x$, Fig. 2; Fig. 2, a plan or top view of the same.

Similar letters of reference indicate corresponding parts in the two figures.

This invention relates to a new and improved machine for hulling and dressing rice—that is to say, for removing the hulls from the rice and divesting it of the inner coating or pellicle which covers the grain, the whole work being done simultaneously or at one operation and in a perfect manner.

To enable those skilled in the art to fully understand and construct my invention, I will proceed to describe it.

A represents a framing, which may be constructed in any proper manner to support the working parts of the machine; and B is a cylindrical screen, which is composed of pieces of wire-cloth $a$, secured to the inner side of a frame composed of longitudinal bars $b\ b'$, the ends of which are attached to circular heads $c\ c$, provided with concentric annular flanges $d\ d$, which work in bearings $e$ on the framing A, the flanges $d\ d$ serving as journals for the screw B. Within the screw B there are placed three annular stones, $C\ C'\ C''$. These stones are secured to the bars $b'$ by means of screws $f$, and said stones are placed at equal distances apart, one being at each end of the screen and one at the center thereof. (See Fig. 1.) The wire-cloth $a$ does not extend entirely over the outer surfaces of the stones $C\ C'\ C''$. It merely laps over their edges. The stones $C'\ C''$ are beveled at their face sides, as shown at $f$ in Fig. 1, the other stone, C, having a face, $g$, which is at right angles with the axis of the screen B.

D represents a shaft which has its bearings on the frame, A, and which passes centrally through the screen B and through the eyes or central openings, $h$, of the stones $C\ C'\ C''$. On this shaft D there are placed two circular stones, $E\ E'$, said stones fitting in the spaces between the stones $C\ C'\ C''$, and having beveled faces or sides $i$ to correspond with the beveled faces $f$ of the stones $C\ C'\ C''$. The stone E has one of its sides or faces $j$ made at right angles with the shaft D, so as to be parallel with the face $g$ of the stone C. (See Fig. 1.) The stone $E'$ is permanently attached to the shaft D, but the stone E is fitted loosely thereon, and is connected to a rod, F, which is placed longitudinally within the shaft D, and projects beyond one end of it, the rod F having a pendant, $k$, attached to it by means of a screw, $a^x$, which fits in a groove, $b^x$, in the shaft D, and admits of the latter turning in the pendant $k$. The pendant $k$ has a screw, $l$, on which nuts $m$ are fitted, and by turning these nuts the rod F may be moved and the stone E adjusted on shaft D, so as to bring its face $j$ nearer to or farther from the face $g$ of the stone C, as may be desired. This will be fully understood by referring to Fig. 1. The rod F is connected to the stone E by having a pin, $m'$, pass transversely through the rod F and through a slot, $n$, in the shaft D, the ends of said pin fitting in slots $o$ in the stone, the latter having metal plates $p$ secured to each side of it. The screen B is formed of two equal longitudinal parts connected together by screws $q$, and the stones $C\ C'\ C''$ are each formed of two equal parts, a part being secured in each part of the screen. This arrangement admits of the two parts of the screen being detached. The screen B has a rotary motion given it by having teeth $r$ at the periphery of its heads $c\ c$, into which teeth pinions $s$ gear, the latter being on a shaft, G, the bearings of which are on the framing A.

H is a screw which is fitted loosely on the shaft D, and has a cone of pulleys, I, attached to it. This screw is allowed to turn freely on the shaft D, and it is encompassed by a cylindrical shell, J, which may be termed the "hopper," as the rice passes into it to be fed into the screen B by the screw H. The shafts D G and screw H are rotated by any convenient power, and the rice is fed into the screen B by the screw H, and is hulled in passing between the parallel faces $g\ j$ of the stones C E, the stone E being adjusted the requisite distance from the stone C, according to the space required between the faces $g\ j$. The hulled rice then passes between the beveled faces $f\ i$ of the stones $E\ E'\ C'\ C''$, and is thereby completely divested of its inner coating or pellicle.

The red arrows in Fig. 1 indicate the direction or passage of the rice through the screen and between the stones. The dust and fine foreign substances are discharged through the wire-cloth $a$, and the rice is discharged through an opening, $s$, in the screen. (Shown in Fig. 2.)

The screw H performs an important function, as by regulating its speed the rice may be fed more or less rapidly through the screen, and the feed may be so regulated that the screen will be kept full of rice, or nearly so, and the rice prevented from being broken by centrifugal force or action within the screen—a contingency likely to occur if the screen contain but a small quantity of rice.

The screen B may rotate in a contrary direction to the stones E E', or they both may rotate in the same direction, according to the amount of attrition or rubbing required.

Having thus described my invention, what I claim as new, and desire to secure by Letters Patent, is—

1. The combination of the bevel-faced stones C' C'' and the straight-faced stone C with the central shaft D, screen B, stone E, straight-faced upon one side and beveled upon the other, and the double-beveled stone E, as herein shown and described.

2. Having the stone E made adjustable upon shaft D, independently of the stone E', in the manner and for the purpose herein shown and described.

3. The arrangement of the screw H with the shaft D, in the manner herein shown and described, whereby speed and direction of motion of said screw may be changed and governed without altering the velocity of the shaft D or that of the stones, all as set forth.

SILAS DODSON.

Witnesses:
J. M. CHAMBERLIN,
P. JOHN.